Figure 1:
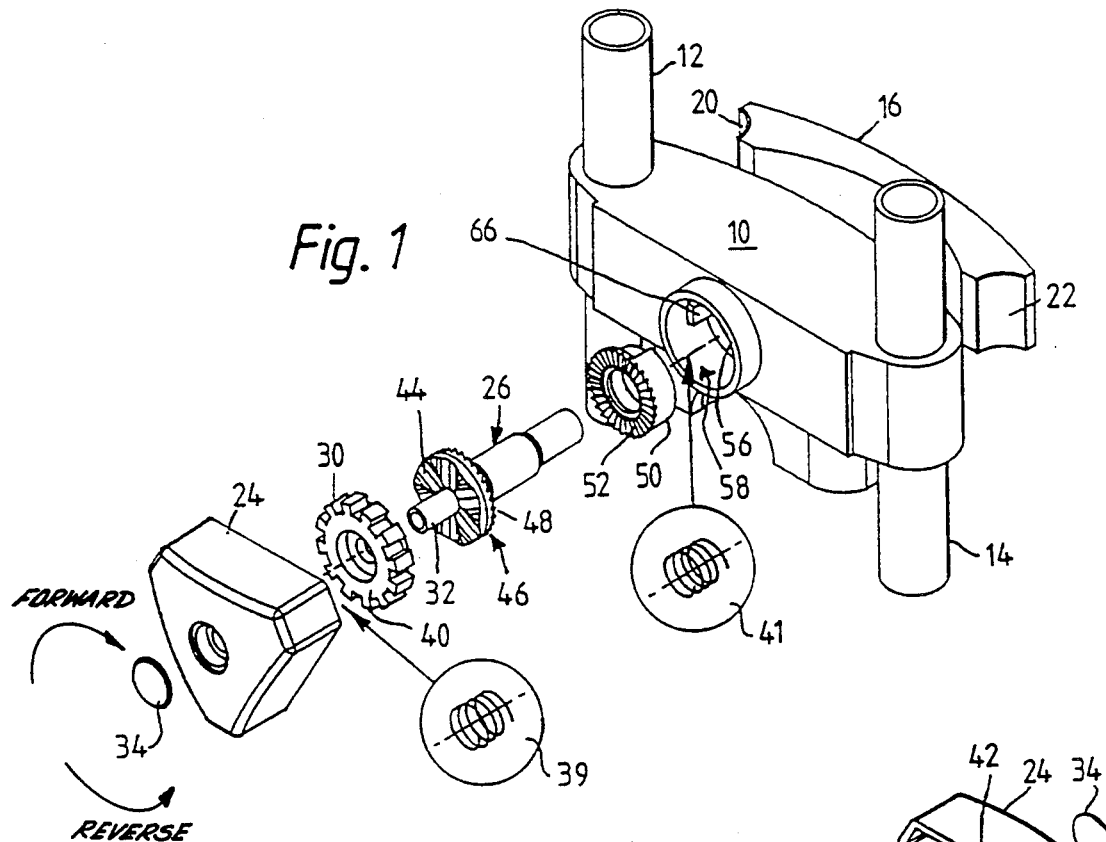

United States Patent

Lindsay

Patent Number: 5,351,922
Date of Patent: Oct. 4, 1994

[54] CLAMP

[75] Inventor: Richard A. Lindsay, Eye, United Kingdom

[73] Assignee: Vinten Group plc, Buckinghamshire, England

[21] Appl. No.: 972,456

[22] PCT Filed: Jun. 28, 1991

[86] PCT No.: PCT/GB91/01052

§ 371 Date: Mar. 11, 1993

§ 102(e) Date: Mar. 11, 1993

[87] PCT Pub. No.: WO92/02756

PCT Pub. Date: Feb. 20, 1992

[30] Foreign Application Priority Data

Jul. 31, 1990 [GB] United Kingdom ............ 9016721.4

[51] Int. Cl.$^5$ ............................................. F16M 11/26
[52] U.S. Cl. ................... 248/188.5; 192/48.6; 192/56 R; 192/109 R; 248/188.2
[58] Field of Search ............ 248/188.5, 188.2, 225.31, 248/231.7, 230, 295.1, 298; 403/389, 391, 396, 322; 192/46, 109 R, 48.6, 56 R; 464/39

[56] References Cited

U.S. PATENT DOCUMENTS

| | | | |
|---|---|---|---|
| 2,275,004 | 3/1942 | Behl | 464/39 |
| 2,519,549 | 8/1950 | Coutant et al. | 248/188.5 |
| 2,627,767 | 12/1952 | McDevitt | 464/39 X |
| 3,319,755 | 5/1967 | Digby | 192/46 X |
| 3,577,747 | 5/1971 | Brown | 464/39 |
| 4,674,722 | 6/1987 | Danby et al. | 248/231.3 |
| 4,692,075 | 9/1987 | Metz | |
| 4,702,448 | 10/1987 | LoJacono et al. | 248/230 X |
| 4,832,299 | 5/1989 | Gorton et al. | 248/231.7 |
| 4,844,397 | 7/1989 | Skakoon et al. | 248/231.7 |
| 4,880,406 | 11/1989 | Van Horn et al. | |
| 5,168,972 | 12/1992 | Smith | 192/46 |
| 5,169,106 | 12/1992 | Rasmussen | 248/230 |

FOREIGN PATENT DOCUMENTS

| | | | |
|---|---|---|---|
| 3604497 | 8/1987 | Fed. Rep. of Germany | 248/188.5 |
| 8812402 | 11/1988 | Fed. Rep. of Germany | |
| 2323913 | 4/1977 | France | |
| WO8912777 | 12/1989 | PCT Int'l Appl. | |

Primary Examiner—Ramon O. Ramirez
Assistant Examiner—Derek J. Berger
Attorney, Agent, or Firm—Kenyon & Kenyon

[57] ABSTRACT

The need for readjustment of clamps due to wear and tear is overcome by the provision of clamping means comprising a first member (16) movable relative to a housing (10) to effect clamping; torque limiting drive means (30,44) rotatable to effect that movement; and lost motion stop means (50,60) rotatable by the drive means into a first stop position in which continued rotation of the drive means is prevented and, through reverse rotation of the drive means, into a second stop position in which continued reverse rotation of the drive means is prevented. This clamping means can be used in particular to clamp telescoping legs, for instance on camera tripods.

11 Claims, 3 Drawing Sheets

CLAMP

SUMMARY OF THE INVENTION

According to the present invention clamping means comprises:

a first member movable relative to a housing to effect clamping;

torque limiting drive means rotatable in one direction relative to the housing to effect the said clamping movement of the first member;

lost motion stop means rotatable by the drive means into a first stop position relative to the housing (in which continued rotation of the drive means is permitted) and into a second stop position spaced angularly from the first stop position, as a consequence of rotation of the drive means in an opposite direction, in which second stop position continued rotation of the drive means in said opposite direction is prevented.

The torque limiting drive means may comprise a knob, shaft and torque limiting clutch between the knob and the shaft.

The lost motion stop means may comprise an intermediate member rotatable on the shaft and driven by a unidirectional slipping clutch from the driven member of the torque limiting clutch, having an abutment thereon which is engageable with one or more abutments on or in the housing.

Although the invention is of primary use as a clamp for clamping telescoping features of an adjustable leg of a stand such as a tripod for cameras and the like, a clamping means embodying the invention is not in any way limited to such applications and may be incorporated into any clamp such as a clamp for scaffolding poles.

Without prejudice to the generality of the above another aspect of the invention comprises a tripod having at least one telescoping leg having relatively slidable members and a clamp constructed in accordance with the invention comprising a clamping device for securing the slidable members in any chosen position.

The invention also lies in a camera stand having at least one telescoping leg formed from at least two relatively slidable elongate members and a clamp constructed in accordance with the invention secured to one of the two relatively slidable members and clampable onto the other, so as to enable the two members to be secured in any desired telescoped position.

In one embodiment of the invention is a clamping device in which a first member is rotatable relative to a housing to rotate a second member relative to the housing which engages a third member for moving the latter into locking engagement with a fourth member, with respect to which the housing is slidable, drive between the first member and the second member is transmitted by a first drive means comprising a torque limiting clutch and reverse rotation of the second member relative to the housing is limited by the engagement of an intermediate member with stop means on or in the housing, the rotated position of the intermediate member relative to the second member being determined by a second drive means comprising a unidirectional clutch between the second member and the intermediate member which permits relative rotation between the second member and the intermediate member when the intermediate member has been rotated into engagement with the stop means due to rotation of the second member in a direction to move the third member into the said locking engagement but prevents relative rotation therebetween in the opposite sense, so that the second member is prevented from rotating in the said opposite sense by more than an angular amount sufficient to bring the intermediate member into engagement with the other side of the stop means.

This clamping device may additionally comprise locking means by which the intermediate member can be releasably locked into a desired angular position relative to the housing. The locking means may take the form of, for instance, a spring-loaded plunger associated with the housing, the plunger being capable of engaging with a recess provided in the intermediate member so as releasably to lock the intermediate member in the desired position. Such a locking means is useful to prevent the clamping device being released from a desired clamping position by the accidental application of a load to the first member (usually a knob to be rotated by the user when operating the device).

Figure 2:
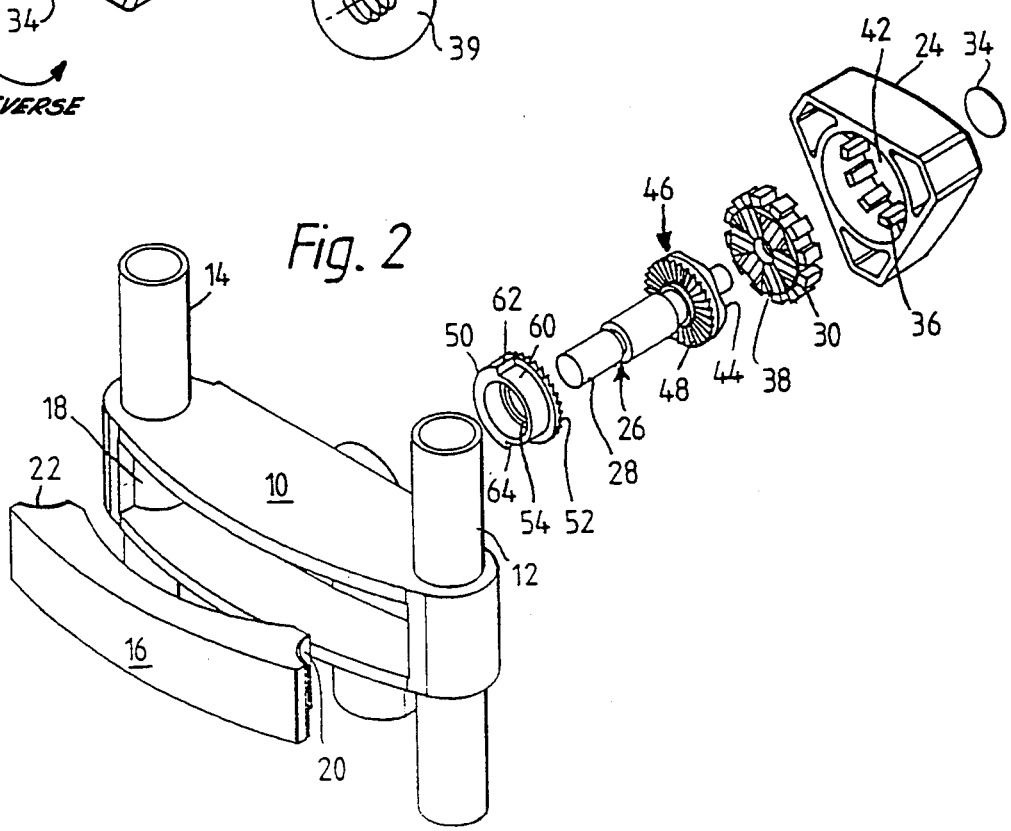
Figure 3:
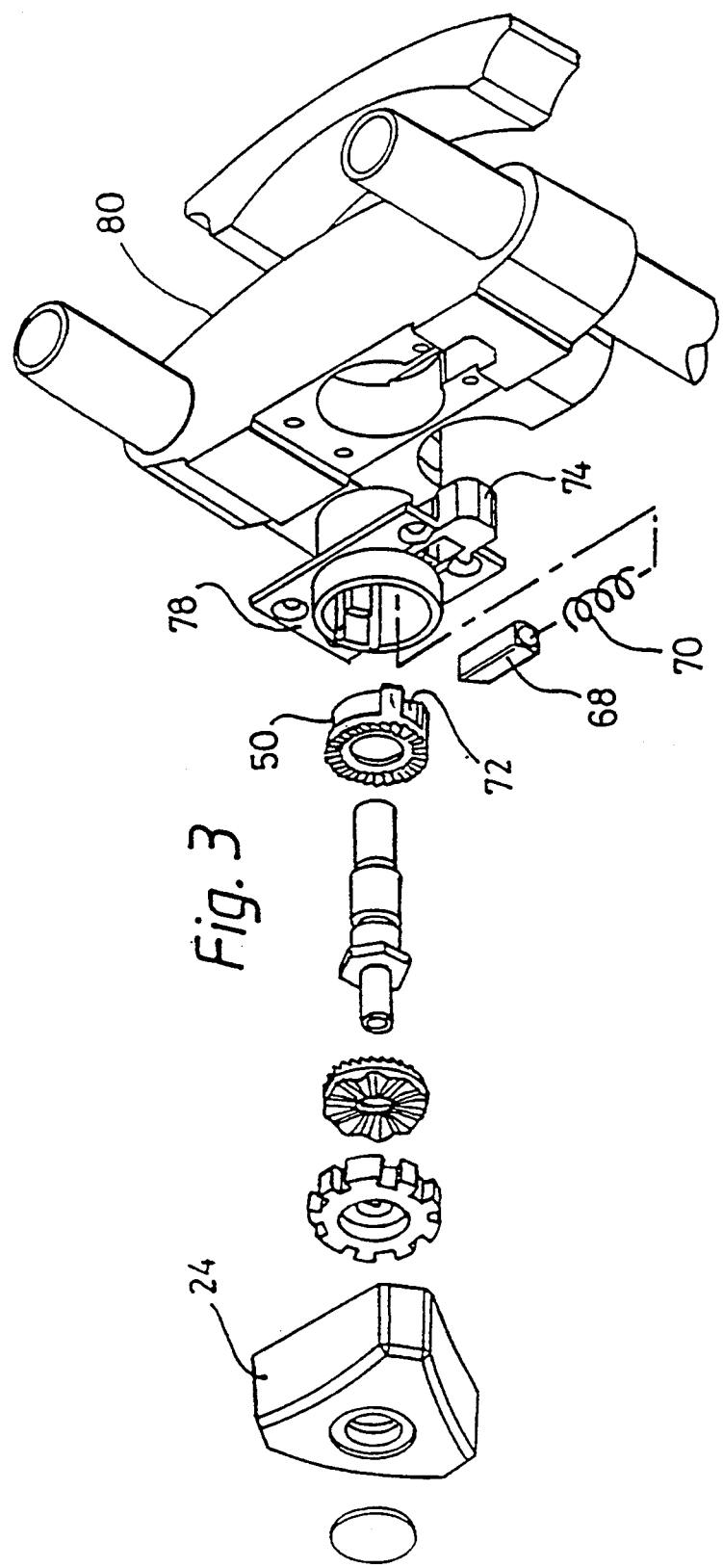
Figure 4:
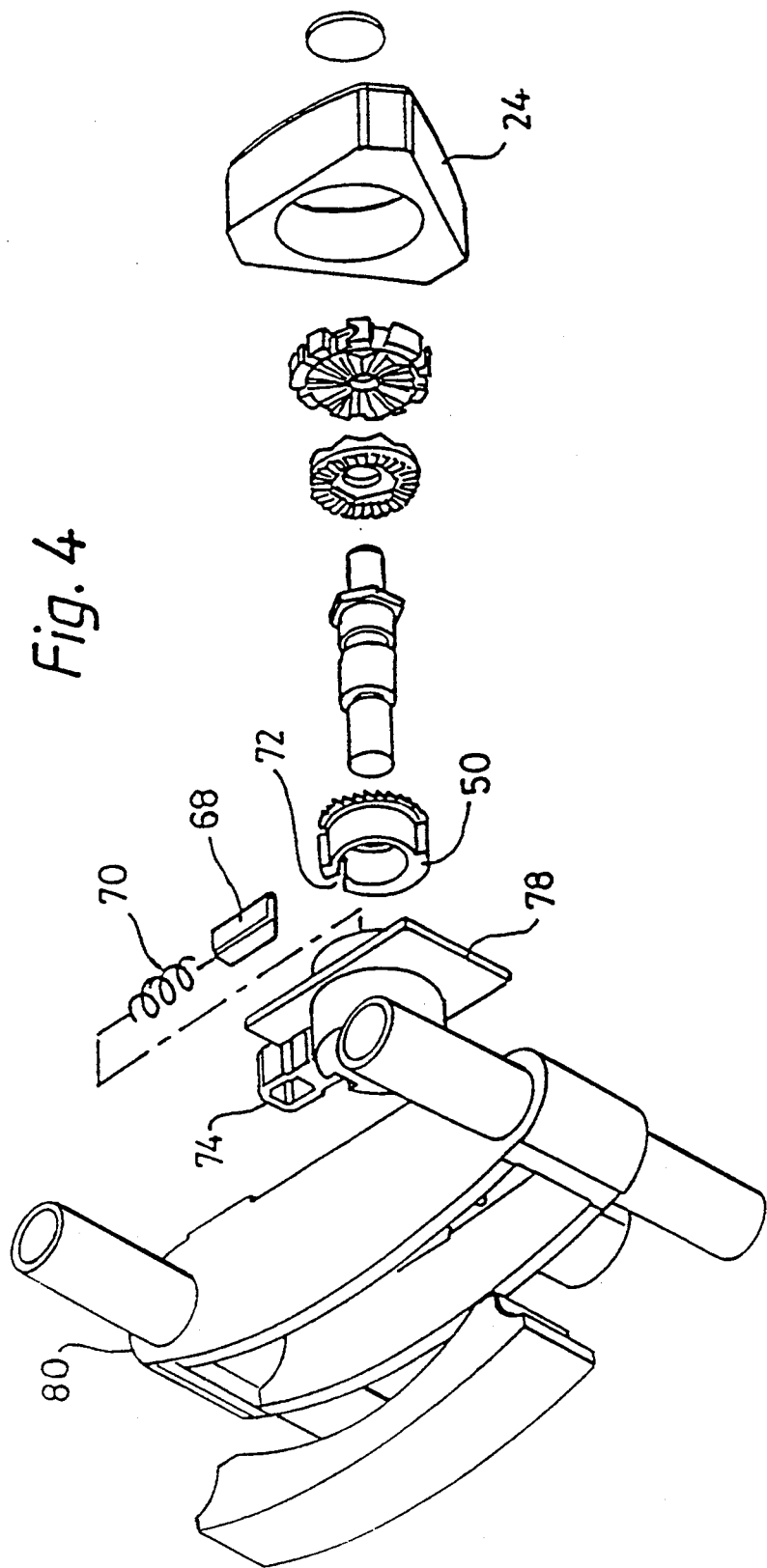

The invention will now be described by way of example with reference to the accompanying drawings in which:

FIG. 1 s an exploded view of a clamping device embodying the invention;

FIG. 2 i a similar view of the same device from another angle;

FIG. 3 is an exploded view of an alternative clamping device embodying the invention; and FIG. 4 an exploded view of the device of FIG. 3 from another angle.

In the drawings a housing 10 is slidable on a pair of parallel struts 12, 14 which together form one part of a telescoping leg of a camera tripod. A second part (not shown) comprises a single strut attached to the central part of the housing and extending between the two struts 12, 14. The latter are attached to the camera support at the top of the tripod and the single strut has a foot at its lower end the position of which relative to the top of the tripod can be adjusted by sliding the housing up or down the struts 12, 14.

When the desired position is found the housing is clamped in position on the struts 12, 14 by the clamping of a bridge piece 16 against the exposed surfaces of the two struts (12, 14) within the housing 10 (one exposed surface of which is visible at 18 in FIG. 2). The cooperating surfaces of the ends of the bridging piece 16 (namely curved surfaces 20, 22 ) are shaped so as to conform to the external surfaces of the struts 12, 14 where these are exposed within the housing 10. In the example illustrated the struts are of circular cross-section and are in fact hollow tubes to reduce their weight. However, their cross-section may be of any shape.

The clamping action is achieved by rotating a knob 24 in a clockwise forward direction as viewed in FIG. 1 which in turn rotates a shaft 26 the remote end 28 of which is formed with a double start thread which engages in a nut (not shown) held captive in the bridge piece 16 so that as the shaft is rotated the nut is caused to move axially towards (or away from) the knob, and with it the bridge piece 16.

In accordance with the invention drive from the knob to the shaft is conveyed via a peripherally castellated clutch plate 30 rotatable on the shaft section 32 and trapped within the knob 24 when the latter is attached to the end of the shaft by means of a bolt or rivet or any other convenient device shown diagrammatically at 34. Relative axial movement between the knob and the clutch plate is possible without loss of drive therebetween by engagement of the castellations around the periphery of the clutch plate 30 with complementary internally formed castellations in the knob as shown at 36 in FIG. 2.

The clutch plate 30 has an undulating end face 38 which under the action of a spring 39 between the other end face 40 and the internal end face 42 of the knob, is urged into driving engagement with the similarly shaped end face 44 of a second clutch plate 46 which is fixedly mounted on the shaft 26 and is conveniently formed integrally therewith as shown.

The other end face 48 of the second clutch plate 46 is formed with radial teeth forming one part of a freewheel clutch, the other part of which is an annular member 50 having a complementary set of radial teeth 52 formed thereon, the shape of the two sets of teeth being such that relative rotation between the two members 46 and 50 is possible in one sense, but not in the other. The two sets of radial teeth are held in engagement by a second spring 41 located between the internal end face 54 (see FIG. 2) and the opposed internal radial face 56 of the circular cavity 58 in the housing 10. The spring force of spring 41 causing the two sets of teeth 48, 52 to remain in engagement is less than that of spring 39 urging the undulating faces 38, 44 of the clutch plates 30, 46 into engagement.

The outer surface of the member 50 is formed with a section of reduced radius so as to form an arcuate recess 60 between two radial ends 62, 64, a radial inwardly directed abutment 66 on the internal wall surface of the circular cavity 58 is accommodated within the recess and serves to prevent the member 50 from being rotated in either direction by more than the angular extent of the recess.

The action of the clutch 38, 44 is to transmit rotation between the knob 24 and the shaft 26 unless the resistance to rotation is greater than that which can be transmitted between the two clutch members 38, 44 whereupon the spring 39 urging 38 into contact with 44 is overcome and the clutch plate 30 is urged axially into the knob to permit the undulations of one surface to ride over those of the other, thereby allowing the knob to be rotated in a series of steps relative to the shaft 26. By selecting the spring rate so the maximum clamping effect achieved by turning of the knob can be determined.

Reverse or anticlockwise rotation of the member 50 brings the surface 62 into contact with the abutment 66 and prevents reverse rotation of the knob 24 from its position of maximum clamping effect to an amount determined by the extent of the arcuate recess 60. Typically this is approximately 180°.

The engagement of the teeth 48, 52 is such that reverse rotation of 46 is prevented.

In the forward direction, when the radial end 64 engages the abutment 66, the shaft is capable of rotating relative to the member 50 and indexing the ring 46 relative to the member 50 until the new position of maximum clamping torque is achieved by rotation of the knob 24 in a clockwise sense.

During the take-up of the slack caused by wear etc the member 50 is prevented from rotation relative to the housing by virtue of the engagement of the face 64 with the abutment 66. Reverse rotation of the knob 24 produces rotation of the member 50 in an anticlockwise sense until radial end 62 engages the abutment 66 again, corresponding to a reverse rotation of the knob by approximately one half a turn.

In the device shown in FIGS. 3 and 4, most of the components correspond with those of the device of FIGS. 1 and 2, and have not been separately labelled. Components 78 and 80, shown separately for clarity, together represent the housing 10 of FIGS. 1 and 2, and would normally be produced as a single piece moulding. However, the device of FIGS. 3 and 4 additionally incorporates a spring loaded plunger 68, capable of locating in a notch 72 provided in the side of the clutch member 50. The plunger 68 is located in housing 74 and engages, under the action of internal spring 70, with notch 72 when the desired clamp position has been acquired. Subsequent release of the clamp requires the plunger to be expelled from the notch 72 against the action of spring 70, and this serves to inhibit the clamp being released from its desired position by an accidental load being applied to the knob 24. This adds a further degree of accuracy and reliability to the operation of the preferred clamping device of FIGS. 3 and 4.

I claim:

1. Clamping means for a movable element comprising:
    a housing to receive the movable element:
    a clamping member movable relative to the housing to effect clamping of the movable element;
    rotary drive means mounted in the housing and rotatable in one direction relative to the housing to effect the said clamping movement of the first member and in an opposite direction to release clamping;
    torque limiting means in said rotary drive means to limit force applied to the clamping element;
    lost motion stop means between the drive means and housing rotatable by the drive means in said one direction into a first stop position relative to the housing and into a second stop position spaced angularly from the first stop position in said opposite direction, and
    clutch means between the rotary drive means and said lost motion stop means adapted to slip when said first stop position is reached allowing the rotary drive means to continue turning in said one direction until the movable element is clamped and to engage when the rotary drive means is turned to release the movable element so that release movement of the rotary drive is limited by the lost motion stop means to travel between said first and second stop positions however far the drive means has turned to effect said clamping of the movable element.

2. Clamping means according to claim 1, wherein the torque limiting drive means comprises a knob, a shaft and a torque limiting clutch between the knob and the shaft.

3. Clamping means according to claim 2, wherein the lost motion stop means comprises an intermediate member rotable on the shaft and drive through said clutch by the rotary drive means, said housing having abutment means and the intermediate member having an abutment thereon which is engageable with the abutment means on the housing to provide limited relative rotation between the rotary drive means and the housing.

4. A clamping device according to claim 3, additionally comprising locking means by which the intermediate member can be releasably locked into a desired angular position relative to the housing.

5. A clamping device according to claim 4, wherein said intermediate member includes a recess and the locking means comprises a spring-loaded plunger associated with the housing, the plunger being capable of engaging said recess so as releasably to lock the intermediate member in the desired angular position.

6. A tripod having at least one telescoping leg having relatively slidable members, and a clamp comprising clamping means according to claim 3 for securing the slidable members in any chosen position.

7. A camera stand having at least one telescoping leg formed from at least two relatively slidable elongate members, and a clamp comprising clamping means according to claim 3 secured to one of the two relatively slidable members and clampable onto the other, so as to enable the two members to be secured in any desired telescoped position.

8. A tripod having at least one telescoping leg having relatively slidable members, and a clamp comprising clamping means according to claim 2 for securing the slidable members in any chosen position.

9. A camera stand having at least one telescoping leg formed from at least two relatively slidable elongate members, and a clamp comprising clamping means according to claim 2 secured to one of the two relatively slidable members and clampable onto the other, so as to enable the two members to be secured in any desired telescoped position.

10. A tripod having at least one telescoping leg having relatively slidable members, and a clamp comprising clamping means according to claims 1 for securing the slidable members in any chosen position.

11. A camera stand having at least one telescoping leg formed from at least two relatively slidable elongate members, and a clamp comprising clamping means according to claim 1 secured to one of the two relatively slidable members and clampable onto the other, so as to enable the two members to be secured in any desired telescoped position.

* * * * *

UNITED STATES PATENT AND TRADEMARK OFFICE
CERTIFICATE OF CORRECTION

PATENT NO. : 5,351,922   Page 1 of 3
DATED : October 4, 1994
INVENTOR(S) : LINDSAY It is certified that error appears in the above-indentified patent and that said Letters Patent is hereby corrected as shown below:

In the Abstract, lines 7 and 8, delete "in which continued rotation of the drive means is prevented" and insert --in which the clamping member provides the requisite clamping force and does not move further forward to increase the force because the torque limiting drive means slips with further rotation of the input to the drive means--.

Column 1, before "Summary of the Invention" insert

--<u>Field of Invention</u>
  This invention concerns clamps.
<u>Background</u>
  Adjustable components such as telescoping legs on tripods, require clamps to hold the telescoping sections in a chosen extended condition. Typically the clamps have two sections which are drawn together to clamp a central member therebetween in response to the tightening action of a threaded member linking the two said sections.

UNITED STATES PATENT AND TRADEMARK OFFICE
CERTIFICATE OF CORRECTION

PATENT NO.  : 5,351,922
DATED       : October 4, 1994
INVENTOR(S) : LINDSAY

It is certified that error appears in the above-indentified patent and that said Letters Patent is hereby corrected as shown below:

It is also desirable to provide for overtightening of such a threaded member and additionally advantageous for the threaded member to be held relatively captive so that it cannot be completely unscrewed.

Present designs of clamp having these characteristics tend to suffer from component distortion and settlement and need adjustment after a period of use of a few months or a year or so, in order to prevent creep occurring when in the clamped mode.

It is an object of the present invention to provide a clamp which possesses these desirable characteristics but does not suffer from the need for readjustment due to wear and tear.--

UNITED STATES PATENT AND TRADEMARK OFFICE
CERTIFICATE OF CORRECTION

PATENT NO. : 5,351,922
DATED : Oct. 4, 1994
INVENTOR(S) : LINDSAY

It is certified that error appears in the above-indentified patent and that said Letters Patent is hereby corrected as shown below:

Column 1, line 16, "of rotation" should be --of reverse rotation--.

Column 3, line 30, "64, a" should be --64. A--.

Signed and Sealed this

Eighteenth Day of July, 1995

Attest:

BRUCE LEHMAN

Attesting Officer

Commissioner of Patents and Trademarks